United States Patent Office 3,060,374
Patented Oct. 23, 1962

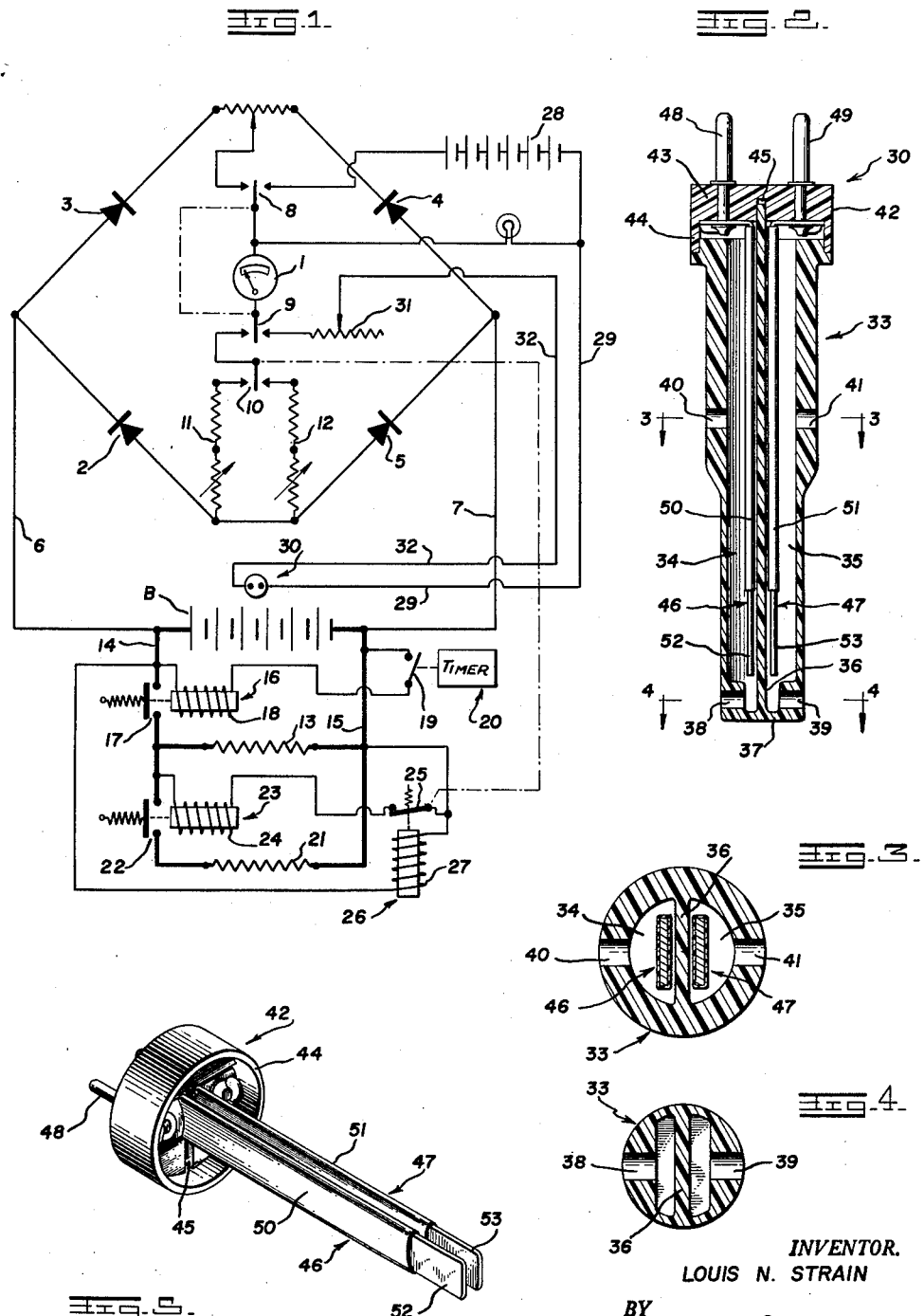

3,060,374
BATTERY TESTERS
Louis N. Strain, 24 Sea Spray Drive, Centerport, R.D. 5,
Huntington, N.Y.
Filed Apr. 4, 1960, Ser. No. 19,573
6 Claims. (Cl. 324—29.5)

This invention relates to the testing of electrical batteries and more particularly to an improved apparatus for testing multi-cell storage batteries.

A number of different types of storage battery testers have been proposed and commercially adopted in the past, these including devices which measure the terminal voltage of the battery, either under discharge or under "open circuit" conditions, and devices for determining or comparing the voltages of the individual cells of the batteries. For many purposes, testers of the type which compare cell voltages have been found to be particularly useful and have met with considerable success. In recent years, however, there has been a very decided trend in the storage battery industry to adopt battery constructions wherein the connections between the individual cells are completely embedded in insulating material forming part of the battery casing. The more modern multi-cell storage batteries also involve a relatively complicated cell arrangement. Because of these two recent design trends, the heretofore successful devices for testing batteries by cell comparison cannot be satisfactorily employed. Not only is it difficult for the operator of the testing device to make contact with the cell connectors, as by means of a hand prod, but it is also difficult for the relatively unskilled operator to determine where, in the relatively complicated multi-cell arrangement, a particular connection should be made during testing.

A general object of the present invention is to provide a testing apparatus which can be employed to determine and compare conditions of the individual cells of a multi-cell storage battery without requiring that electrical connections be made, during use of the apparatus, to points such as the cell connector straps between the battery cells.

Another object is to provide such a battery tester capable of measuring the conductivity of the cell electrolyte as an indication of the condition of the cell.

A further object is to provide an improved multi-purpose battery tester for multi-cell storage batteries, which tester eliminates the use of the usually required hand prod or like manually operated electrical connecting device.

It has long been recognized that the conductivity of the electrolyte in a storage battery cell is related to the specific gravity of the electrolyte and, therefore, to the condition of the cell. However, it has been found that the electrolyte conductivity does not vary as a linear function of specific gravity. Thus, if specific gravity of the electrolyte is plotted against resistivity, it is found that the resistivity first decreases with increasing specific gravity and then, when the specific gravity reaches about 1.22, begins to increase fairly rapidly. With a typical electrolyte at 25° C., the resistivity is approximately 1.4 ohm-cm. when the specific gravity is 1.14 and is also 1.4 ohm-cm. when the specific gravity is 1.34. For specific gravities between the values just mentioned, the resistivity drops to as low as about 1.2 ohm-cm. Accordingly, it is obvious that a simple measurement of conductivity of the electrolyte is ambiguous, insofar as condition of the battery cell is concerned, unless the approximate specific gravity of the electrolyte is also known.

The present invention provides, in a single battery testing apparatus, the combination of means for determining the state of charge of the battery and means for determining, by a conductivity measurement, the relative conditions of the battery cells. In its most advantageous form, the invention employs, as the means for determining the state of charge of the battery, an open circuit testing means designed to indicate whether or not the state of charge of the battery is in excess of 50%. If, by employing such means, it is determined that the state of charge is in excess of 50%, it can then be safely assumed that the cells of the battery are in good condition, so that comparison of the cells is not necessary. On the other hand, if it is determined by the open circuit terminal voltage test that the state of charge of the battery is less than 50%, it is proper to assume that one or more of the cells of the battery might be in poor condition, so that a cell comparison test will be useful, and it can also be assumed that the overall specific gravity of the electrolyte is below about 1.220. Once it is assumed that the specific gravity of the electrolyte is below this value, all electrolyte conductivity readings can be taken as meaningful, since it is only for specific gravities above 1.220 that resistivity of the electrolyte begins to increase with an increase in specific gravity.

In order that the manner in which these and other objects are attained in accordance with the invention can be understood in detail, reference is had to the accompanying drawings, which form a part of this specification, and wherein:

FIG. 1 is a circuit diagram of a storage battery tester constructed in accordance with one embodiment of the invention;

FIG. 2 is a longitudinal cross-sectional view, with some parts shown in elevation, of an electrode probe unit employed in the tester of FIG. 1;

FIG. 3 is a transverse cross-sectional view taken on line 3—3 of FIG. 2;

FIG. 4 is a transverse cross-sectional view taken on line 4—4, FIG. 2, and

FIG. 5 is a perspective view of the electrode assembly of the probe unit shown in FIG. 2.

Referring now to the drawings in detail, and first to FIG. 1 thereof, it will be seen that the embodiment of the invention illustrated includes, as the electrical means for determining the state of charge of the battery, a circuit for determining the open circuit terminal voltage of the battery, this circuit also being capable of testing under discharge conditions. Such circuit includes a voltmeter 1, advantageously of the suppressed zero type disclosed in U.S. Patent 2,817,816, issued December 24, 1957, to Lewis A. Medlar, bridge-connected rectifiers 2–5, and leads 6 and 7 connectable to the terminals of the multi-cell storage battery B to be tested. Leads 6, 7 are connected respectively to the input terminals of the rectifier bridge, as shown. Voltmeter 1 is connectable across the galvanometer points of the rectifier bridge via circuit means including a first two-position switch 8, arranged between the meter and one galvanometer point of the rectifier bridge, a second such switch 9, arranged on the other side of the meter, selector switch means 10 and one or the other of parallel resistance branches 11, 12, depending upon the position of switch means 10. Switches 8 and 9 are ganged for simultaneous operation.

The load circuit provided to discharge the battery under test includes a first discharge resistor 13 connected across the terminals of battery B via conductors 14 and 15. A relay 16 has its normally-open contacts 17 connected in conductor 14 in series with resistor 13, the actuating winding 18 of relay 16 being connected between conductors 14 and 15 via the normally-open contacts 19 of a time switch indicated generally at 20. A second discharge resistor 21 is connected in parallel with resistor 13 via the normally-open contacts 22 of a relay 23, the actuating winding 24 of relay 23 being connected across resistor 13 via the normally-closed contacts 25 of a relay 26. Actuating winding 27 of relay 26 is connected between conductors 14 and 15, as shown, so as to receive current whenever a battery B is connected. Relay 26 is designed to be actuated only by voltages above a predetermined value.

The particular embodiment illustrated in FIG. 1 is intended for use with batteries having either of two different voltage ratings, for example, with 6-volt and 12-volt batteries. When a 6-volt battery is to be tested, both resistors 13 and 21 are employed, in parallel. When a 12-volt battery is to be tested, only discharge resistor 13 is included in the circuit. Assuming that battery B is a 6-volt battery and that timer 20 has been operated to close contacts 19 and thus energize relay 16 to close its contacts 17, the contacts 25 of relay 26 remain closed, causing energization of relay 23, since the battery voltage is insufficient to actuate relay 26, and both resistors 13 and 21 will be utilized, in parallel, to provide the proper discharge rate for the battery under test. If the battery B has a 12-volt rating, its higher voltage will energize relay 26, causing deenergization of relay 23, so that only discharge resistor 13 is included in the circuit and the proper discharge rate for the 12-volt battery is assured.

Branches 11 and 12 present different resistance values chosen for proper operation of meter 1 with 6-volt and 12-volt batteries, respectively. For simplicity of operation, selector switch means 10 takes the form of an additional contact set in relay 26, so that relay 26 serves automatically to select both the proper discharge resistor and the proper one of resistance branches 11, 12 in response to the voltage of battery B.

To obtain an open circuit terminal voltage reading for battery B, the test is carried out with contacts 19 open, so that neither discharge resistor is utilized. Since the supply circuit for actuating winding 27 of relay 26 is unaffected by contacts 19, relay 26 operates, in response to the voltage of battery B, to select the one of branches 11, 12 corresponding to the voltage rating of the battery. Meter 1 accordingly indicates the open circuit terminal voltage of the battery and, for practical purposes, the state of charge of the battery can be inferred from this indication.

If the open circuit terminal voltage reading so obtained indicates that the state of charge of the battery is in excess of 50%, it can be safely assumed that the cells of the battery are in good condition, else such a high open circuit voltage could not exist. If, on the other hand, the open circuit terminal voltage reading indicates a state of charge less than 50%, it is then known that (1) one or more of the cells of the battery may be in poor condition, and (2) the overall specific gravity of the electrolyte of the battery is less than 1.220. Thus, the indication of a state of charge less than 50% shows that the individual cells of the battery can be compared by comparing the conductivities of the cell electrolytes and, since the specific gravity is less than 1.220, conductivity readings will be meaningful rather than ambiguous.

Examination of thousands of batteries in use in automobiles has shown that, for practical purposes, open circuit voltages of 6.15 v. and 12.30 v. can be taken as indicating a 50% state of charge for 6-volt and 12-volt batteries, respectively.

Turning now to the means for comparing the conditions of the individual cells of the battery B, and still referring to FIG. 1, it will be seen that one fixed contact of switch 8 is connected to the positive terminal of a source 28 of direct current, advantageously consisting of six 1.5 v. zinc-carbon primary batteries connected in series. The negative terminal of source 28 is connected, via conductor 29, to one electrode of an electrode probe unit indicated generally at 30 and hereinafter described in detail. One fixed contact of switch 9 is connected, via adjusting rheostat 31 and conductor 32, to the other electrode of probe unit 30.

Switches 8 and 9 are advantageously ganged for simultaneous manual operation. In one position, switches 8 and 9 are operative to connect voltmeter 1 to the galvanometer point of the rectifier bridge, for overall battery testing. In their other position, switches 8 and 9 connect voltmeter 1 in series with current source 28 and the electrodes of probe unit 30.

Referring to FIGS. 2–5, probe unit 30 comprises a generally cylindrical hollow casing 33 molded from acid-resistant electrical insulating material. The interior of the casing is divided into two longitudinally extending electrode-receiving chambers 34 and 35 by an integrally formed partition 36. At one end, both chambers 34 and 35 are closed by an end wall 37 integral with the partition 36 and the outer cylindrical wall of the casing. Adjacent end wall 37, the outer wall of the casing is provided with a pair of diametrically opposed electrolyte entrance ports 38 and 39, port 38 opening into chamber 34 and port 39 opening into chamber 35. At points spaced considerably from end wall 37, the outer wall of the casing is provided with a pair of diametrically opposed gas outlet ports 40 and 41 communicating with chambers 34 and 35, respectively.

The end of casing 33 opposite end wall 37 is closed by a cap 42, of electrical insulating material, having a generally cup-like form providing a relatively thick wall 43 and a cylindrical skirt 44, the latter embracing the end of the casing wall and being sealed thereto by a suitable cement. At this end of the casing, partition 36 extends beyond the end of the outer casing wall and is received in a groove 45 in wall 43 of cap 42. As best seen in FIGS. 2 and 5, cap 42 carries a pair of elongated electrodes 46 and 47, each electrode having a laterally offset end portion seated against the inner face of wall 43 and secured thereto by a combined mounting and connector pin. Thus, electrode 46 is secured in place by pin 48, FIG. 2, and electrode 47 by pin 49. Pins 48, 49 cooperate with a suitable conventional connector socket (not shown) to connect electrode 46 to conductor 32, FIG. 1, and electrode 47 to conductor 29, FIG. 1, conductors 29 and 32 being embodied in a suitable flexible insulated cable.

Electrodes 46 and 47 are formed of metal strip, advantageously of an alloy containing on the order of 94% lead and 6% antimony. The body portions of the electrodes 46 and 47 are provided with coverings 50 and 51, respectively, of electrical insulating material, tip portions 52 and 53 of the electrodes being left exposed, the exposed tip portons having equal, predetermined surface areas. Advantageously, coverings 50 and 51 are formed of polyvinyl chloride tubing, dilated, placed on the electrode, and shrunk in place.

The electrodes are spaced apart by a distance such that electrode 46 can be disposed in chamber 34 and electrode 47 in chamber 35 and, when so disposed, will be spaced somewhat from partition 36. The electrodes are of such length that, when cap 42 is in place as seen in FIG. 2, the tips of the electrodes will be disposed adjacent to electrolyte entrance ports 38 and 39. Accordingly, when the probe unit is held in the position seen in FIG. 2 and is inserted downwardly into a battery cell, through the filling opening of the cell, electrolyte of the cell will enter through ports 38 and 39 and rise within chambers 34 and 35 to cover exposed tip portions 52 and 53 of the electrodes. A conductive circuit between the electrodes is thus provided by the electrolyte, such circuit extending from tip portion 52, out through port 38, across below end wall 37 and in through port 39 to tip portion 53.

When switches 8 and 9 are connected to complete the series circuit from current source 28 through meter 1 and the electrolyte between electrode tip portions 52 and 53, meter 1 functions as an ammeter and, since the voltage of source 28 and the voltage of the battery cell between electrode tips 52 and 53 are known, the indication given by the meter is representative of the conductivity of the cell electrolyte.

Cell electrolyte conductivity readings taken as just described will ordinarily not be completed before evolution of hydrogen gas from the electrolyte in casing 33 occurs. In order to assure acceptable accuracy, uniformity of gas bubble formation at the tips of the electrodes and of departure of the gas bubbles from the electrode surfaces is desirable. Accordingly, tip portions 52 and 53 are advantageously provided with a matte surface of lead, that is, an irregular surface made up of fine particles of lead of substantially uniform size and shape. Such a surface can be provided, for example, by "aging" the tip portions of the electrodes in a lead sulfate-sulfuric acid solution to plate the matte surface onto the electrodes. Gas evolved at the electrode tips passes upwardly through the electrolyte and escapes from the casing 33 via outlet ports 40 and 41.

Cell electrolyte conductivity readings are taken for each cell of the battery and compared. A predetermined difference between the electrolyte conductivity of any two cells of the battery can be taken as indication of a corresponding difference in specific gravity between the cells. Hence, such predetermined difference indicates an excessive cell misalignment and, therefore, a bad battery. For practical purposes, such predetermined difference can be taken as that difference in cell electrolyte conductivities which occurs when the two cells vary by 25% of full charge.

Meter 1 can be provided with a single scale calibration useful for both the open circuit terminal voltage test and the cell comparison test. As a practical example, an arcuate portion of the meter dial is divided into a green upscale zone and a red downscale zone, the entire arcuate portion being also subdivided into segments identified as "A, B, C, D, E, F, X" (reading from the upscale end of the arcuate portion), segments A–C being in the green portion of the scale portion and segments D–X in the red portion. After attempting recharge and removing polarization voltage, the open circuit terminal voltage readings are then interpreted as follows, for example:

| Segment Indicated by Meter Needle | Interpretation |
|---|---|
| X | Battery inoperative |
| F | Battery failing |
| E | Battery very poor |
| D | Battery poor |
| C | Battery fair |
| B | Battery good |
| A | Battery excellent |

For the cell comparison test, the meter can be readily calibrated at manufacture to give a difference indication of three of the segments, for example, when the difference in cell conductivities represents a 25% difference in state of charge.

In order to read the difference in cell conductivities in terms of the segments of the meter dial, it is necessary to adjust the device in such manner that, when the probe unit is first inserted in a cell of the battery, the meter needle will indicate a given segment, say, segment C. Such adjustment is accomplished by manual adjustment of the rheostat 31, FIG. 1, the rheostat being provided with any suitable manual actuating knob or the like (not shown). After such adjustment has been made during probing of the first cell, the probe unit is then placed successively in all the cells of the battery and differences in the meter readings are noted.

I claim:

1. In a tester for multi-cell storage batteries, the combination of first electrical means operative to determine the state of charge of the battery to be tested, and second electrical means operative to compare the conditions of the battery cells, said second electrical means comprising an electrical meter, a source of electrical current, a probe unit constructed for insertion selectively into the individual battery cells and including a pair of electrodes arranged for electrical contact with the battery electrolyte when the probe unit is so inserted, said source of current being exterior to the cell into which said probe unit is inserted, and circuit means connecting said electrodes, said source and said meter in series.

2. A storage battery tester in accordance with claim 1 and wherein said first electrical means is operative to determine the open circuit terminal voltage of the battery.

3. In a tester for multi-cell storage batteries, the combination of first electrical means operative to determine the state of charge of the battery to be tested, a probe unit insertable selectively in the individual cells of the battery and including electrode means arranged for electrical contact with the battery electrolyte when the probe unit is so inserted, and second electrical means including said probe unit and a source of electrical current exterior to the cell in which said probe unit is inserted, operative to determine the conductivity of the electrolyte in the individual cells of the battery.

4. In a tester for multi-cell storage batteries, the combination of a first electrical circuit operative to determine the open circuit terminal voltage of the battery to be tested, said first circuit including an electrical meter; a probe unit constructed for insertion selectively in the individual cells of the battery and including electrode means arranged for electrical contact with the battery electrolyte when the probe unit is so inserted, and a second electrical circuit operative to determine the conductivity of the electrolyte in the individual cells of the battery, said second electrical circuit comprising said probe unit, a source of electrical current exterior to the cell in which said probe unit is inserted, and said meter.

5. In a tester for multi-cell storage batteries, the combination of a first testing circuit including means for connection to the terminals of the battery to be tested; a probe unit constructed for insertion selectively in the individual cells of the battery and comprising electrode means disposed for electrical contact with the battery electrolyte when the probe unit is so inserted; a second testing circuit including said probe unit; an electrical meter, and switching means selectively operable to connect said meter either in said first circuit or said second circuit, said first circuit being operative, when said meter is included therein, to determine the terminal voltage of the battery as an indication of the overall state of charge of the battery, and said second circuit being operative, when said meter is included therein, to determine the conductivity of the electrolyte in the cell in which said probe unit is inserted.

6. In a tester for multi-cell storage batteries, the combination of electrical means for determining the overall state of charge of the battery to be tested, said electrical means including an electrical meter having a pair of terminals; a probe unit constructed for insertion selectively in the individual cells of the battery and including a pair of electrodes disposed for electrical contact with the electrolyte of the battery when said probe unit is so inserted; a source of electrical current exterior to the cell in which said probe unit is inserted; circuit means including an electrical switch for connecting the series combination of said source and one of said electrodes to one terminal of said meter; an adjustable resistance, and circuit means including an electrical switch for connecting the series combination of said adjustable resistance and the other of said electrodes to the other terminal of said meter.

References Cited in the file of this patent

UNITED STATES PATENTS

| 1,373,951 | Cox et al. | Apr. 5, 1921 |
| 2,922,104 | Godshalk et al. | Jan. 19, 1960 |